UNITED STATES PATENT OFFICE.

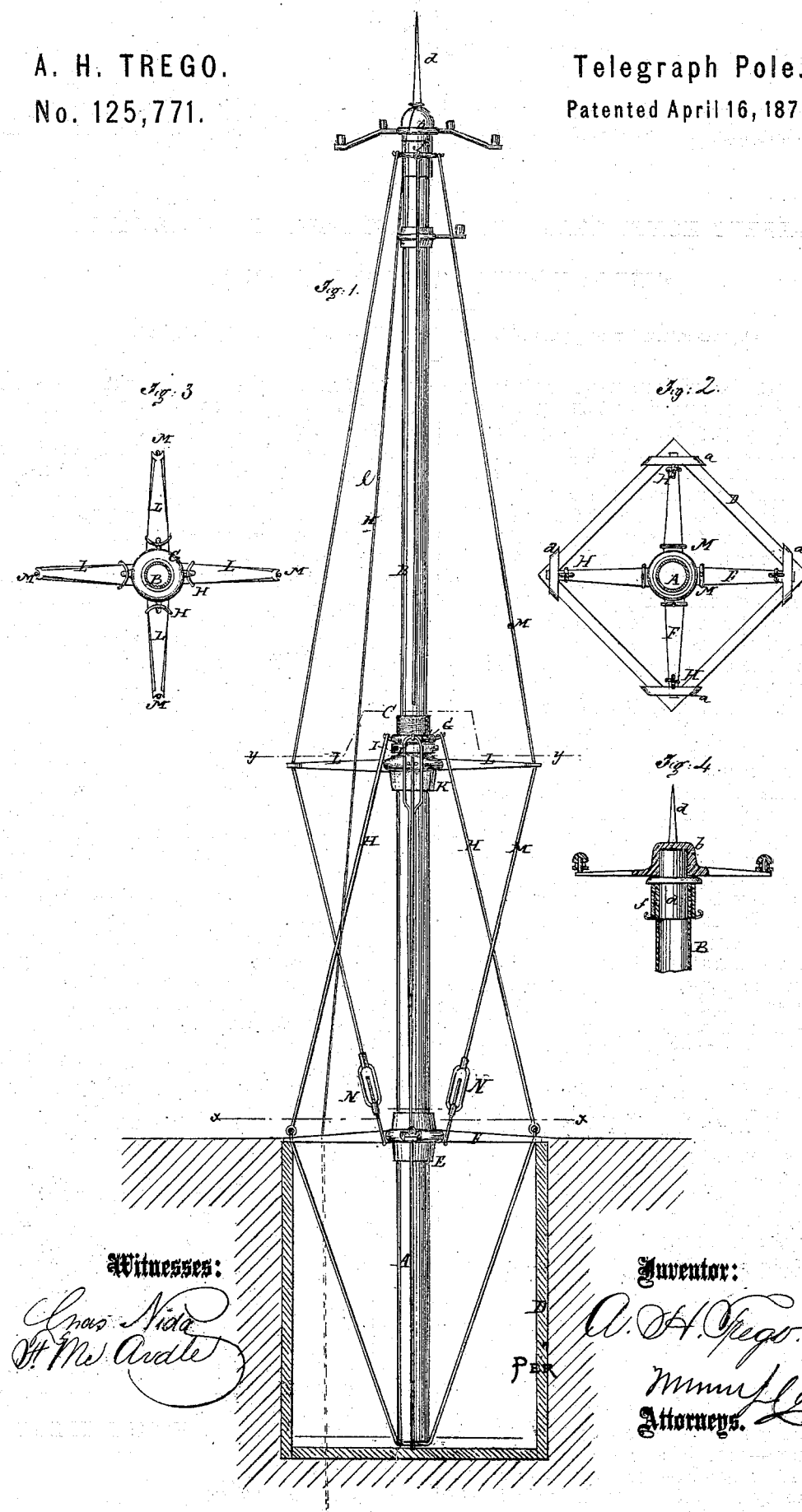

ALFRED HOMER TREGO, OF PHILADELPHIA, PENNSYLVANIA.

IMPROVEMENT IN TELEGRAPH-POLES.

Specification forming part of Letters Patent No. 125,771, dated April 16, 1872.

Specification describing a new and improved Telegraph-Pole, invented by ALFRED HOMER TREGO, of Philadelphia, in the county of Philadelphia and State of Pennsylvania.

The invention will first be fully described and then clearly pointed out in claims.

Figure 1 is a side elevation of a telegraph-pole, composed of two sections of tubes and two sets of guys. Fig. 2 is a horizontal section on the line $x$ $x$ of Fig. 1. Fig. 3 is a horizontal section on the line $y$ $y$; and Fig. 4 is a sectional elevation of the top of the pole, showing the insulators used thereat.

Similar letters of reference indicate corresponding parts.

A is one section and B another of a pole comprising two sections, which are jointed together at C, where the upper one, which is the smallest, screws into the top of the other one, the base of which is set in a box, D, and packed in with cement, concrete, lime and sand, lime and gravel, stones, mortar, and the like. The box is to be planted in the ground for holding the pole erect. At the top of the box I have provided a hub, E, with arms, F, extending laterally to the edges of the box; and at the upper end of this section is a ring or collar, G, for the connection of the upper ends of the guys H, whose lower ends are connected to the lower end of section A, while near the center the said guys are stretched over the ends or through the arms F, for bracing the section. Below the collar G is a screw-threaded ring or collar, I, employed for forcing the collar G upward for straining the guys H; and below this ring is another hub, K, with arms for straining another set of guys, M, which are connected at the lower ends of the hub E and at the top of the upper section. These guys may be tightened like the others by an adjustable collar, or they may have swivels, N, for tightening them. I propose to use any number and lengths of sections as I may require, and to make the tube in any shape, whether round, square, or otherwise, or of any size. The iron, as well as the wire guys or braces, will be galvanized, or otherwise treated, to protect it from corrosion. I may also use one or more tubes in each section—that is, side by side, and confined together by a band or hoop for strengthening one by the other. If the pole is not to be more than fifteen or twenty feet high one section of tube will do, with one set of guys; but if higher it will be better to have two sets. The box may have a bottom, as shown in the drawing, for holding the lower end of the pole resting on and connected to it, and the lower hub and arms may be attached to the top of the box by straps, $a$, of iron bent over and nailed to it. But instead of having the box for holding the pole, it may be mounted on a stone or other suitable base or planted in the ground. The arms at the top of the pole for holding the insulators may be insulated by means of an inverted cap, $b$, mounted on the top of a wood, glass, India-rubber, or other block, $d'$, placed in the top of the upper tube. In the top of this cap I place a composition point, $d$, and attach a copper rod or wire, $e$, thereto, with its lower end anchored in the ground to convey away the electricity and prevent the pole from becoming a conductor. This copper conductor may be placed inside of the pole, if preferred. If, however, it be desired to use the pole as a conductor, the insulators at the top will be dispensed with, and in this case the hub at the top of the pole will serve both as a support for the message-wires and for tightening the guy-rods, which may then be connected to it.

The message-wire supporter and cap which cover the insulators may be made of malleable cast-iron or other suitable material. The cap $b$ is made larger than the cup $f$ at the top of the pole, which holds the insulators, and fits over it, so as to shed rain.

Having thus described my invention, I claim as new and desire to secure by Letters Patent—

1. The combination, with arms F, fastened to box D by straps $a$, of the guys passing therethrough and under the pole, as and for the purpose set forth.

2. The combination, with the tubular poles and the bracing-guys, of the straining-collars G and I, substantially as specified.

3. The combination, with the pole, of a box or case to be employed in securing the pole permanently in the ground, substantially as specified.

ALFRED HOMER TREGO.

Witnesses:
 WM. K. SHRYOCK,
 D. NEWLIN FELL.